Feb. 12, 1946.   W. J. BLANCHARD   2,394,889
LUBRICATING SYSTEM
Filed April 6, 1944   2 Sheets-Sheet 1

Inventor
W. J. BLANCHARD
By
Attorneys

Feb. 12, 1946. W. J. BLANCHARD 2,394,889
LUBRICATING SYSTEM
Filed April 6, 1944 2 Sheets-Sheet 2
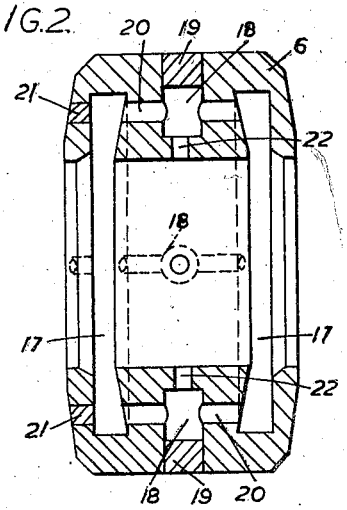
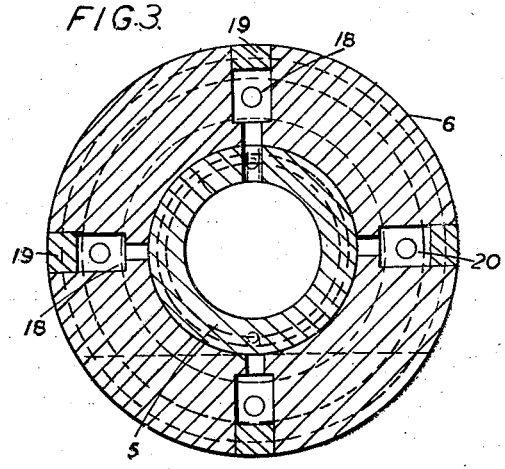
Inventor
W. J. BLANCHARD
By
Attorneys Patented Feb. 12, 1946

2,394,889

UNITED STATES PATENT OFFICE 2,394,889

LUBRICATING SYSTEM

Walter Joseph Blanchard, Park Lane, London, England

Application April 6, 1944, Serial No. 529,793
In Great Britain April 22, 1943

1 Claim. (Cl. 308—109)

Rollers, wheels and other elements that rotate slowly around horizontal axes often present difficult lubricating problems. For example, bush roller chains forming part of large conveyors, e. g. sugar cane conveyors, move slowly and are usually lubricated by periodical injections of grease from a grease gun. Experience shows, however, that it is difficult or impossible to lubricate the various wearing surfaces effectively in this way, with the result that the life of the chains is much reduced.

An important object of my invention is to provide a system by which a light oil or other free-flowing lubricant can be caused to circulate over the wearing surfaces of an element mounted to rotate slowly around a horizontal bearing.

Another object of my invention is to provide an improved lubrication system for a slowly moving bush roller chain or other mechanism in which the bearing is composite, consisting of a bush fitting closely around a fixed shaft or pin.

In my invention an annular cavity is formed in the hub of the element at each end; these cavities serve as catchment reservoirs for the lubricant. They are connected to one or more lifter cavities that are formed between them in the hub of the element and that also communicate with the bearing. These lifter cavities serve to lift lubricant fed to them from the catchment reservoirs and to discharge it to the bearing by gravity. Thus as the element rotates oil is continuously supplied to the bearing, trapped by the catchment reservoirs, led back to the lifter cavities, lifted, and supplied again.

In order to explain my invention fully I will now describe its preferred embodiment, in the form of a lubrication system for a bush roller chain, with reference to the annexed drawings, in which Figure 1 is a longitudinal section through one roller assembly of the chain;

Figure 2 is a similar section through the roller alone;

Figure 3 is a cross-section through the roller and bush;

Figure 1:
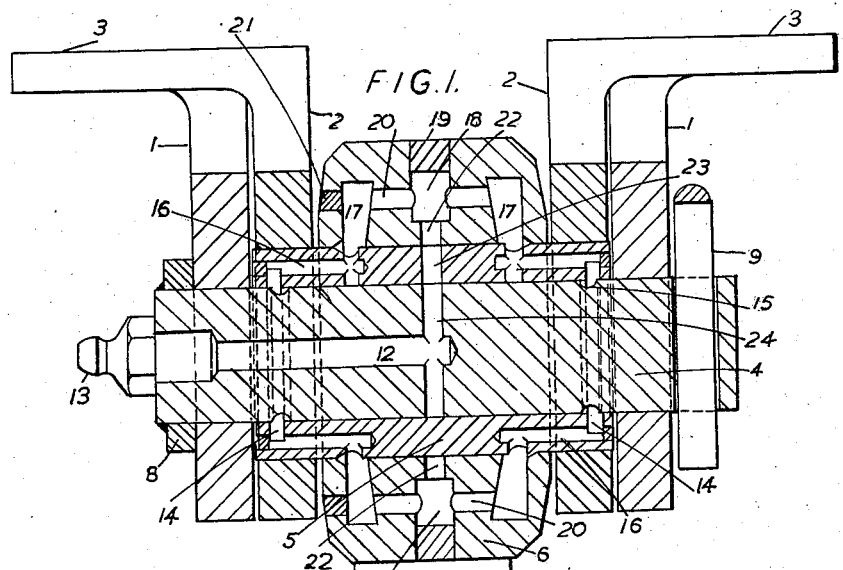
Figure 4:
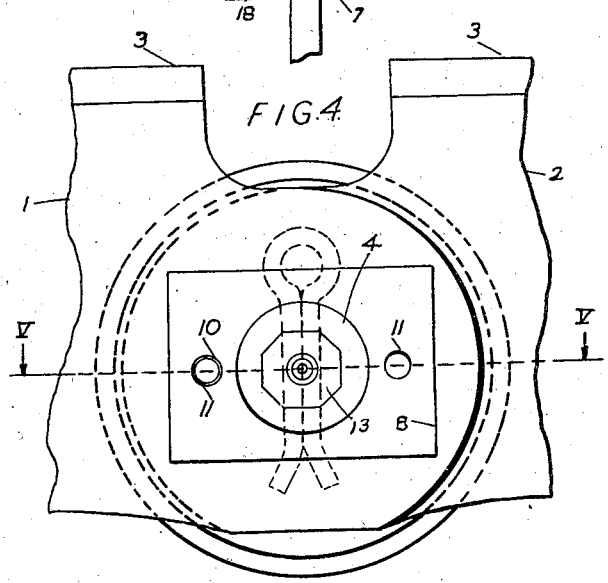
Figure 4 is a view from the left-hand side of Figure 1.
Figure 5:
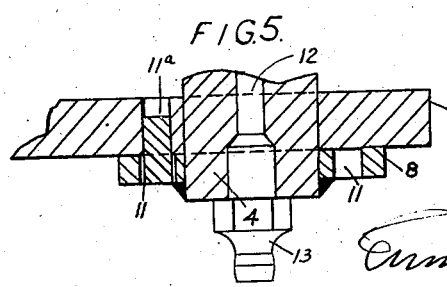
Figure 5 is a section on the line V—V in Figure 4.

The assembly shown is part of a sugar cane conveyor chain which is built up from outer links 1 and inner links 2 both of which are formed with ears 3 to which the conveyor slats are fixed. These links connect each roller assembly to the next. The outer links 1 fit tightly over the ends of a pin 4, which is closely surrounded by a bush 5, which in turn carries the roller 6, which runs on a track 7. The bush makes a running fit on the pin and the inner links 2 make a force fit on the bush. Part of the surface of the bush forms a bearing surface for the roller. The parts of the assembly are maintained in position axially by a plate 8 welded to one end of the pin 4 and by a cotter pin 9 at the other end. To prevent the pin 4 from rotating, a pin 10 is passed through registering holes 11 and 11a in the plate 8 and left-hand outer link 1 respectively, two holes 11 being provided so that the pin and plate can be turned through 180° for additional wear.

The lubrication system incorporated in the roller assembly according to this invention includes an axial filling passage 12 in the pin 4 into which lubricant can be forced through a nipple 13 and from which radial passages 24 run to the bearing surface of the pin. The lubricant creeps axially along the surface of the pin to annular cavities 14 formed in the inner wall of the bush 5. These cooperate with grooves 15 in the pin 4 to stop the lubricant from flowing further axially, and it is led by the cavities 14 into axial passages 16 in the bush 5. These in turn communicate through openings in the outer wall of the bush with annular cavities 17 formed in the hub of the roller 6. These cavities 17 are the catchment reservoirs and they receive lubricant not only from the passages 16 but also from the bearing surface constituted by the outer surface of the bush.

The roller 6 is formed with four lifting cavities 18, which are formed by making radial bores and then closing the ends by plugs 19. Passages 20 parallel to the axis of the roller are made to connect the reservoirs 17 with the lifting cavities 18 and their ends are closed by plugs 21. Passages 22 run from the cavities 18 to the bearing surface of the roller 6. The passages 20 and 22 are of smaller cross-sectional area than the cavities 18, so that the latter form pockets with discharge openings of small cross-sectional area than that of the interior of the cavity and they may be looked on as buckets which carry the lubricant upwards and then discharge it by gravity to the bearing surface formed between the roller and the bush. The bush is also formed with a single passage 23 with which each of the passages 22 register in turn, so that the lubricant also runs down under gravity to the surface of the pin 4. It is highly desirable to lubricate this surface because when the assembly changes its slope or goes around a sprocket there is some rotation of the bush 5 around the pin 4.

It will be seen that, as the roller rotates, the bottom lifting cavity becomes filled and retains enough lubricant as it moves upwards to ensure discharge of some lubricant at the top. The lubricant works its way outwards along the bearing surfaces and back to the reservoirs.

The system of lubrication according to the invention is applicable to any slowly rotating elements but cannot be applied to elements which rotate at a speed so high that the centrifugal force on the lubricant prevents its discharge under gravity in adequate quantities.

I claim:

A wheel bearing comprising an inner horizontal bearing element, an intermediate element surrounding the inner element and having an inner surface bearing upon the outer surface thereof, and an outer element surrounding the intermediate element and having an inner surface bearing upon the outer surface thereof, the outer and intermediate elements each having annular cavities extending outward from their inner surfaces, the intermediate element having passages connecting its annular cavities with those of the outer element, the outer element having a lifter pocket connected with its annular cavities by passages, and the outer and intermediate elements having radial passages for conducting lubricant from the lifter pocket to their inner bearing surfaces.

WALTER JOSEPH BLANCHARD.